3,196,071
SLIME CONTROL AGENTS

Robert K. Smith, Springfield, and Ellis Abrams, Philadelphia, Pa., assignors to E. F. Houghton & Co., Philadelphia, Pa., a corporation of Pennsylvania
No Drawing. Filed Oct. 4, 1962, Ser. No. 228,270
13 Claims. (Cl. 162—161)

The present invention relates to slime control agents for the inhibition of baceteria and fungi.

A purpose of the invention is to produce a method for the treatment of industrial waters to minimize bacterial or fungal growth.

A further purpose is to produce a bactericide or fungicide which is effective against bacteria and fungi commonly causing industrial processing problems.

A further purpose is to produce a slime control agent which offers economic advantages.

A further purpose is to produce a slime control agent which is non-substantive to many materials frequently involved in aqueous processing systems such as paper stock, textiles, leather and the like, and therefore, will not build up objectionable toxic concentrations which would subsequently interfere with use of these materials.

A further purpose is to produce a slime control agent which is effective in low concentrations in the range from ten to five hundred parts per million, suitably in an aqueous system which may vary through the normal ambient range.

A further purpose is to produce a slime control agent which is readily made from available materials including polyhydric alcohols, alpha halogenated aliphatic acids having no more than four carbon atoms in the carbon chain and an aldehyde having not in excess of four carbon atoms in the carbon chain.

Further purposes appear in the specification and in the claims.

In connection with the art of paper making, where wood pulp is formed, prepared as a suspension, and deposited as a wet web and then dried, slime control agents possessing bactericidal and fungicidal activity have been extensively used.

It is believed that the best use of the invention may be in paper mills to control the formation of slime in paper stock. Slime is a general term used in the paper industry to refer to a mass of bacteria and fungi or other microorganisms which also include fibers and debris matted together. The mass shows objectionable physical characteristics which have varyingly been described as stringy, pasty, rubbery, like-tapioca, gelatinous, mealy, hard or horny.

Slime in a paper mill is frequently encountered as a result of massive colonies of bacteria and/or fungi and/or other substrates breaking off or sluffing from their point of incubation and becoming admixed with the pulp in the paper machine. The resulting paper which is manufactured during this occurrence has highly objectionable characteristics. Initially, the web of the paper machine may become broken, resulting in extensive shut down time and repair operations. Additionally, the paper may be discolored and rendered unfit for its intended use by the presence of slime, particularly, from bacterial or fungal growth. A number of bactericides and fungicides have been used in the paper industry as slime control agents; for example, such agents are discussed in U.S. Patents Nos. 2,929,435 and 2,840,598.

While many effective results have been obtained with commercially available slimicides, the problem has not been completely solved. There is reason to believe that bacteria will become resistant to specific slimicides when they have been used over extended periods of time. A flareup of colony growth can then result in disastrous slime conditions and alternate bactericides or fungicides must be utilized in order to again permt the satisfactory manufacture of paper.

The present invention relates to bactericides and fungicides and methods of controlling bacteria and fungi at lower cost, with greater effectiveness on organisms that have not been previously effectively controlled, and by utilization of low concentrations which make possible elimination of side effects. The products of the invention are added to the water used in paper making.

Another advantage of the present invention is that the materials in the concentration used are not substantive and do not combine with the material being treated, for example the paper, and therefore do not build up objectionable toxicity.

The composition of the invention is also useful for treating other materials as a bactericide and fungicide. For example, it will treat textiles, leather, plastics, cutting oils, soap, detergents, water based paints, and soil for sterilization. It can be incorporated in materials which would generally be known in the trade as softeners, dubs, coating compositions or sizes.

The composition of the invention is widely applicable in low concentrations as low as 10 p.p.m. It can also be used in concentrations as great as 500 p.p.m. or greater. For many applications the range of treating concentration will be 50 to 100 p.p.m. and in many cases the desirable level is about 75 p.p.m. These concentrations apply whether the carrier is cold water or hot water.

An additional feature of the composition of this invention is that a mutual phase with iodine can be prepared through judicious selection of the polyhydric alcohols which are incorporated into the system. Utilizing a polyhydric alcohol has more than three hydroxy groups, ethoxylation of one group can be readily carried out with subsequent inclusion of iodine in order to increase the effectiveness of the preparation. Eaxmple 16, below, gives an illustration of the properties and behaviour of the mutual phase containing iodine. The desirable iodine content of this phase is from 1 to 15% and most desirably, about 5 to 10% by weight. The iodine will be fed to the water system in concentrations of 10 to 500 p.p.m.

The bactericide and fungicide of the invention includes an acetal group and further includes a halogen substituted carboxylic acid group. The acetal group may be a portion of a heterocyclic ring or may be acyclic in character thereby creating a bridge between two polyhydric alcohols moieties.

The following formula is a specific example of one composition of the invention, 5,5 - bis(bromoacetoxymethyl)-m-dioxane.

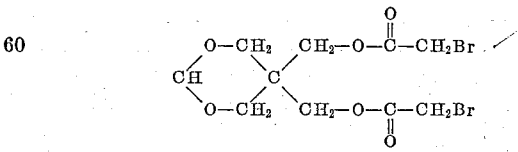

The following formula is a specific example of another composition of the invention, 4-bromoacetoxymethyl-m-dioxolane:

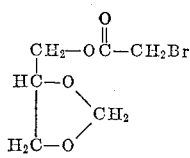

The composition of the invention comprises the reaction product of three compounds, namely, a polyhydric alcohol, an alpha halogen substituted aliphatic acid having a carbon chain length not in excess of four carbon atoms and an aliphatic aldehyde having a carbon chain length not in excess of four carbon atoms.

From these graphic presentations of the elementary representations of this invention, extension thereof is obvious to those skilled in the art. The ratio of aldehyde to polyhydric alcohol to halocarboxylic acid will vary depending upon the individual structures of the individual polyhydric alcohols and very possibly, upon the specific resistance of undesirable bacterial strains or fungus strains to specific molecular configurations. It will be evident that the latter property cannot be predicted in advance and that the best possible arrangement of molecular structure for combating mutations of bacteria may or may not be the best possible structure for combating such mutations in the future.

POLYHYDRIC ALCOHOLS

A wide variety of polyhydric alcohols may be used, but for good results the ratio of the number of hydroxyl atoms to the number of carbon atoms in the polyhydric alcohol should not be less than 1 to 3. The polyhydric alcohol as well known will contain at least 2 carbon atoms.

Suitable polyhydric alcohols used with success may include ethylene glycol, glycerine, trimethylol ethane, trimethylol propane, pentaerythritol, 1,2,3 trihydroxybutane, 1,2,4 trihydroxybutane, 1,2,3 trihydroxypentane, 1,2,3,4 tetrahydroxypentane, sorbitol and corresponding structures as will be evident to those skilled in the art.

ALPHA HALOGEN SUBSTITUTED ALPHATIC ACID

The alpha halogen substituted aliphatic acid will preferably be halogenated acetic acid. It may be any alpha halogenated aliphatic acid having not more more than four carbon atoms in the carbon chain, straight or branched, saturated or unsaturated.

While in the broad concept any halogen can be used, experimental results indicate that it is decidedly desirable to use bromine, chlorine or iodine, and best results are obtained with bromine or iodine.

The acid may have either 1, 2 or 3 or more substituted halogen atoms.

Good results can be obtained using bromoacetic acid, dibromoacetic acid or tribromoacetic acid, monochloroacetic acid, dichloroacetic acid or trichloroacetic acid, iodoacetic acid, diiodoacetic acid or triiodoacetic acid, alpha bromopropionic acid, alpha chloropropionic acid, alpha bromobutyric acid, alpha chlorobutyric acid, and the like. One can also use fluoroacetic acid, difluoroacetic acid, trifluoroacetic acid, and the like.

ALDEHYDES

The third important ingredient is an aldehyde having not more than four carbon atoms in the carbon chain. While ordinary formaldehyde can be used, we preferably employ paraformaldehyde. The aldehyde can be saturated or unsaturated and can have one or more aldehyde groups. Other aldehydes which may be used are ethoxypropionaldehyde, isobutyraldehyde, glyoxal, acetaldehyde, acrolein, and crotonaldehyde.

REACTION CONDITIONS

The manufacture of the desired substances can be carried out in a number of alternate routes with equal facility. Acid catalysis may be used to accelerate the reaction although, in some cases, the aliphatic halogen substituted acid will provide sufficient activity for the purposes required. Generally, such acid catalyst will have ionization constants of greater than $10^{-3}$. (For reference to acid catalyst, see Fieser and Fieser, Organic Chemistry (3rd edition, 1956) page 272 and English and Cassidy, Principles of Organic Chemistry (2nd edition, 1956) page 156. The proportion of such acid catalyst can vary widely from 0.1 to 0.5% based on the total weight of the reacting ingredients.

The order of addition of the reactants does not appear to be critical although minor differences can be observed. As will be shown in later examples, the initial reaction of the glycol with the appropriate aliphatic acid may be carried out with subsequent conversion of the reaction product to the formal or acetal as the case may be. Alternately, all the reactants may be charged initially to the reaction system and thereby, the number of steps required for production of the desired material are minimized.

The invention under discussion has the advantage of incorporating what are believed to be two dissimilar types of bactericidal or bacteristatic action in one molecule. While the mechanism involved in the elimination of bacteria is not clarified, the effectiveness of the compounds of this invention may be attributable to the fact that the halogenated aliphatic acid moiety may serve as a toxicant to the bacteria or fungi; on the other hand, the presence of the formaldehyde or aldehyde moiety may lead to a denaturization effect which alters the life cycle of the micro organisms involved. The fact should be borne in mind, however, that the specific reactions of the product of this invention with micro organisms is primarily of academic importance in comparison with the commercial advantages which are to be gained through the use of this invention.

There are some obvious advantages which are to be gained through the inclusion of two types of active materials in one molecule. These include, among others, the relative ease of storage and handling of an ester acetal of the type under discussion in contrast to the problems involved in handling unreacted formaldehyde or other aldehydes and halogen substituted aliphatic acids. Both of these classes of materials are highly lacrimatory and can also lead to corrosion problems under normal storage conditions. Another obvious advantage to the use of the combined type of materials lies in the consistency with which necessary water treatments can be performed in field operations. The maintenance of a given level of biocidal activity is considerably simplified when using the products of the present invention.

The fact should be further noted, however, that the proportions of halogen substituted aliphatic acids to aldehydes are not immutably fixed. As a general principle, the combination of reactants which will produce the maximum amount of slimicidal action in comparison with the amount of bromine involved in the molecule will provide the most economic means of obtaining the desired effect.

In the composition and process of the invention, it is important that the components be reacted in the proportions per mol of said aliphatic acid of one-fifth to two and one-half mols of said aldehyde and one-fifth to one mol of said polyhydric alcohol.

Example 1

44 grams (0.32 mol) of commercial pentaerythritol, 10.7 grams (0.32 mol) of flake paraformaldehyde, 90 grams (0.64 mol) of bromoacetic acid, 0.2 gram of paratoluene sulfonic acid and 100 ml. of toluene were placed in a 3-neck flask equipped with a thermometer, a stirrer, a Dean-Stark separator and a condenser. The reaction mixture was heated to a temperature of 150 to 160° C. until 19.5 ml. of water were removed from the water trap. The toluene was then removed under reduced pressure. The crude product which resulted was washed twice with water and then was dried. The yield was 107 grams of crude 5,5-bis (bromoacetoxymethyl)-m-dioxane, as compared to a theoretical yield of 125 grams. The bromine content of the compound was determined to be 38% as compared with a theoretical value of 41%.

The compound was tested against microorganisms as referred to below.

*Example 2*

46 grams (0.5 mol) of glycerine, 16.5 grams (0.5 mol) of flake paraformaldehyde, 69.5 grams (0.5 mol) of technical bromoacetic acid, 0.2 gram of toluene sulfonic acid and 100 ml. of toluene were added to a 3-neck flask equipped in connection with Example 1. The reaction mixture was heated to 150° C. and held at the temperature for 1½ hours, by the end of which time 20 ml. of water had been collected in the Dean-Stark separator. The toluene was removed under reduced pressure. The resulting product was then vacuum stripped at 105° C. and a pressure of 2 millimeters of mercury. 105 grams of crude 4-bromoacetoxymethyl-1,3-dioxolane were recovered having a bromine content of 33%. This compares with the bromine content of the pure compound which is 35.4%.

*Example 3*

46 grams (0.5 mol) of glycerine, 139 grams (1.0 mol) of technical bromoacetic acid, 8.3 grams (0.25 mol) of flake paraformaldehyde and 100 ml. of toluene were charged into a 3-neck flask equipped as described in Example 1. The reaction mixture was in this case heated for 5 hours at 120° C. and by this time 20 ml. of water had been removed by the Dean-Stark separator. The toluene was then removed under reduced pressure. The crude reaction product was used for further toxicant studies recorded below.

*Example 4*

89.2 grams (0.2 mol) of polyoxyethylene (6) sorbitol, 83.4 grams (0.6 mol) of technical bromoacetic acid, 6.6 gram (0.2 mol) of flake paraformaldehyde and 100 ml. of toluene were charged into a 3-neck flask equipped as indicated in Example 1. Polyoxyethylene (6) sorbital is an adduct of 6 mols of polyoxyethylene and 1 mol of sorbitol. The reaction mixture was heated at 120° C. for 3 hours, by which time 14.5 ml. of water had been removed in the Dear-Stark separator. The toluene was then removed under reduced pressure and the crude product was further examined for its toxicant efficiency.

*Example 5*

177 grams (0.2 mol) of polyoxyethylene (20) sorbitol 69.5 grams (0.6 mol) of technical bromoacetic acid, 6.6 grams (0.2 mol) of flake paraformaldehyde and 100 ml. of toluene were charged into a 3-neck flask equipped as described in Example 1. The reaction mixture was heated at 120° C. until 12 ml. of water had separated in the Dean-Stark separator. The toluene was then removed under reduced pressure and the reaction product was evaluated for effectiveness as later described.

*Example 6*

60 grams (0.5 mol) of trimethylol ethane, 16.5 grams (0.5 mol) of flake paraformaldehyde, 69.5 grams (0.5 mol) of technical bromoacetic acid and 100 ml. of toluene were charged into a 3-neck flask equipped as in Example 1. The reaction mixture was heated at 110° C. until 22 ml. of water had been collected in the Dean-Stark separator. The toluene was removed under reduced pressure and the crude 5-methyl-5-bromoacetoxymethyl-m-dioxane was evaluated for toxicant efficiency as noted below.

*Example 7*

Equimolar quantities of pentaerythritol and paraformaldehyde were condensed in the presence of 0.3% of toluene sulfonic acid using toluene in the proportions of Example 1 as a solvent. The reaction was carried on at 150° C. until 1 molar equivalent of water was collected in the Dean-Stark separator. The resulting pentaerythritol monoformal was then reacted with 2 mols of technical bromoacetic acid at 150° C. Two additional mols of water were collected in the Dean-Stark separator and the toluene was then removed under reducer pressure. The product was tested and was found to be similar in every way to the product of Example 1.

*Example 8*

68 grams of pentaerythritol (0.5 mol), 16.5 frams (0.5 mol) of flake paraformaldehyde, 94 grams (1.0 mol) of monochloroacetic acid, 0.4 gram of toluene sulfonic acid and 100 ml. of toluene were charged into a 3-neck flask equipped as stated in Example 1. The reaction mixture was heated at 150° C. for 1½ hours by which time 25 ml. of water had accumulated in the Dean-Stark separator. The toluene was removed under reduced pressure and the crude product was evaluated for toxicant efficiency as noted below.

*Example 9*

68 grams of pentaerythritol (0.5 mol), 16.5 grams (0.5 mol) of flake paraformaldehyde, 163 grams (1.0 mol) of trichloroacetic acid, 0.4 gram of toluene sulfonic acid and 100 ml. of toluene were charged to a 3-neck flask equipped as set forth in Example 1. The reaction mixture was heated at 150° C. for 1½ hours, by which time 27 ml. of water had accumulated in the Dean-Stark separator. The toluene was removed under reduced pressure and the crude reaction product was evaluated for toxicant efficiency as noted below.

*Example 10*

62 grams (1.0 mol) of ethylene glycol, 139 grams (1.0 mol) of bromoacetic acid, 0.4 gram of toluene sulfonic acid and 100 ml. of toluene were charged into a 3-neck flask equipped as set forth in Example 1. The reaction mixture was heated under reflux for 2 hours, by which time 18 grams (1 mol) of water had accumulated in the Dean-Stark separator. 16.5 grams (0.5 mol) of commercial paraformaldehyde were then added and the condensation was continued until an additional 10 grams of water had collected in the Dean-Stark separator. The toluene was then removed under reduced pressure, and the crude reaction product was evaluated for toxicant efficiency as noted below.

*Example 11*

2 mols of dibromoacetic acid, 1 mol of paraformaldehyde and 1 mol of pentaerythritol were condensed in the presence of 0.25% of toluene sulfonic acid. Toluene was added in the proportions set forth in Example 1 to assist in the removal of water. The reaction mixture was heated to 150° C. and the water of reaction was collected in the Dean-Stark separator. The toluene was then stripped under reduced pressure and the toxicant efficiency of the product was evaluated as noted below.

*Example 12*

136 grams of pentaerythritol (1.0 mol), 228 grams of trifluoroacetic acid (2 mols), 0.7 gram of toluene sulfonic acid and 100 ml. of toluene were refluxed for 3 hours in equipment referred to in Example 1. The water formed in the reaction was removed by azeotropic distillation. 33 grams of commercial paraformaldehyde (1.0 mol) were then added to the reaction mixture and heated to 160° C. and maintained at that temperature until the water of reaction had been collected in the Dean-Stark separator. The toluene remaining in the product was removed by vacuum stripping and the product was evaluated for toxicant efficiency as noted below.

Example 13

Two mols of bromoacetic acid and one mol of pentaerythritol are condensed in the presence of 0.25% p-toluene sulfonic acid. Toluene was added as in Example 1 to assist the removal of water and the reaction was carried out according to the procedure of Example 1.

The reaction mixture was heated to 150° C. and the water of reaction was removed as formed.

One mol of isobutyraldehyde was then added to the preformed diester and the condensation was continued at 150° C. until no more water of reaction was removed. The toluene was then stripped under reduced pressure. The product was tested on paper mill slimes of common character and was found to possess biocidal activity.

Example 14

Two mols of 2-bromopropionic acid and one mol of pentaerythritol were condensed in the presence of 0.25% p-tolune sulfonic acid. The reaction was carried out as in Example 1.

The reaction mixture was heated to 150° C. and toluene was used to assist in the removal of water of reaction as formed. One mol of paraformaldehyde was then added and the condensation was continued at 150° C. until it was complete, after which the toluene was removed under pressure. This product was tested against pooled microorganisms isolated from several kraft paper mills in the south and was found to be effective in destroying such organisms.

Example 15

Two mols of bromoacetic acid and one mol of pentaerythritol were condensed using the technique described in Example 1 in the presence of 0.25% p-toluene sulfonic acid.

The reaction mixture was heated to 150° C. and toluene was used to assist in the removal of water of reaction as formed. The procedure of Example 1 was used. One-half mol of gloyoxal (30% by weight water solution) was then added and the condensation was continued at 150° C. until it was complete, after which the toluene was stripped under reduced pressure. This product was found to be comparable to the product of Example 14 when tested against pooled microorganisms there referred to.

Example 16

Nine grams of the product of Example 4 were mixed with one gram of powdered iodine in a small Erlenmeyer flask. The flask was stoppered and held at 35° C. for five days. A mutual phase with iodine formed and this was found on analysis to contain 7.8% by weight of iodine.

The product was tested against the pooled organisms referred to above and was found to be effective to destroy them at a level of 50 p.p.m. of treatment.

Example 17

A protective cream for use on the human skin was prepared according to a formula given in Industrial Emulsions with Atlas Surfactants (1953 edition, page 45).

|  | Percent |
|---|---|
| Stearic acid | 15.0 |
| Span 60 | 2.0 |
| Tween 60 | 1.5 |
| Zinc stearate | 5.0 |
| Sorbitol (70% water solution) | 6.0 |
| 4% methyl cellulose (4000 cp.) | 25.0 |
| Water to make | 100.0 |
| Preservative, q.s. | |

The acid, emulsifiers and zinc stearate were melted and brought to a temperature of 90° C. The sorbitol was dissolved in water and brought to 95° C. The water was added to the melted mixture with rapid agitation. After the temperature had dropped to 55° C. the methyl cellulose was worked in with moderate agitation.

Then 0.5% on the weight of the product, of the material of Example 1 was thoroughly incorporated in the mixture to inhibit mold formation. Span 60 is sorbitan monostearate; Tween 60 is polyoxyethylene sorbitan monostearate.

Example 18

Equimolar quantities of iodoacetic acid, paraformaldehyde and glycerine were condensed in the presence of 0.25% of toluene sulfonic acid and toluene in the proportions described in Example 1 was used to assist in the removal of water. The equipment was that of Example 1. The reaction mixture was heated to 110° C. for 2½ hours until the removal of water was complete. Toluene was then removed under reduced pressure and the product was evaluated for toxicant efficiency as noted below.

METHOD USED FOR ROUTINE TOXICANT SCREENING BY SERIAL DILUTION (1) To six sterile cotton plugged test tubes standard Food and Drug Administration broth was added in the following manner:

|  | Ml. |
|---|---|
| Tube 1 | 0.5 |
| Tube 2 | 1.0 |
| Tube 3–6 | 0.5 |

(2) 25% solutions of toxicants were prepared in suitable solvents.

(3) With a microsyringe toxicant was added to the tubes as follows:

|  | Ml. |
|---|---|
| Tube 1 | 0.002 |
| Tube 2 | 0.002 |

(4) With a 1 ml. pipette, 0.5 ml. of toxicant broth mixture from tube 2 with mixed and transferred to tube 3. The transfers were continued through tube 6, discarding the final 0.5 ml.

(5) An inoculum of a 1:10,000 dilution of a 24 hour broth culture was prepared of an isolated organism.

(6) To each tube, 0.5 ml. of inoculum was added. This gave a total of 1.0 ml. in each tube and a final toxicant level of 1.

|  | P.p.m. |
|---|---|
| Tube 1 | 500 |
| Tube 2 | 250 |
| Tube 3 | 125 |
| Tube 4 | 62.5 |
| Tube 5 | 31.3 |
| Tube 6 | 15.6 |

(7) The tubes were incubated at 37° C. for 24 hours.

(8) The presence or absence of visible turbidity was recorded.

(9) 1 loopful of each tube showing no turbidity was transferred to 10 ml. of sterile Food and Drug Administration broth.

(10) The transfers were incubated at 37° C. for 24 hours.

(11) The lowest concentration of toxicant showing no growth is the minimal inhibitory concentration in p.p.m.

Table 1 shows minimum inhibitory concentrations for the products of Examples 1, 2, 3, 5, 6, 7, 8 and 10.

It will be noted that the products of the invention in this case are equally favorable against all organisms tested.

Table 2 compares the minimum inhibitory concentration for the products of Examples 1, 3, 4, 5, 6, 9, 11, 12 and 18. While in some cases the values are higher than the commercial toxicants, they still are within the range in which use can be made.

TABLE 1

[Minimum Inhibitory Concentration (p.p.m.)]

| Example | A. Aerogenes | B. Bycoides | Aspergillus niger | Penicillium expansum | Salmonella typoso | Bacillus sp. | Cultured Inoculum from Paper Mill |
|---|---|---|---|---|---|---|---|
| 1 | 500 | 31.3 | 31.3 | 125 | 125 | +62.5 | 125 |
| 2 | 500 | 62.5 | 62.5 | 62.5 | 62.5 | — | 62.5 |
| 3 | — | — | — | — | — | — | 500 |
| 5 | — | — | — | — | — | — | 500 |
| 6 | — | — | — | — | — | — | 62.5 |
| 7 | 500 | 31.3 | 31.3 | 125 | 125 | 62.5 | 125 |
| 8 | — | 125 | — | — | — | — | — |
| 10 | — | — | — | — | — | — | 125 |

TABLE 2

[Minimum Inhibitory Concentration (p.p.m.)]

| Example | Alkaligenes sp. | Flavobacterium sp. | Bacillus sp. | Staphylococcus albus |
|---|---|---|---|---|
| 1 | 31 | 63 | 31 | 63 |
| 3 | 31 | 63 | 63 | — |
| 4 | 250 | 125 | 250 | 500 |
| 5 | 500 | 500 | 1,000 | 1,000 |
| 6 | 63 | 125 | 250 | 500 |
| 9 | 3,000 | 3,000 | 3,000 | 3,000 |
| 11 | 500 | 250 | 250 | 250 |
| 12 | 3,000 | 3,000 | 3,000 | 3,000 |
| 18 | 31 | 31 | 31 | 31 |

Having thus described our invention, what we claim as new and desire to secure by Letters Patent is:

1. A bactericide and fungicide essentially consisting of a reaction product of a polyhydric alcohol having a ratio of hydroxyl groups to carbon atoms of not less than 1 to 3, an aliphatic acid having a carbon chain length of not in excess of four carbon atoms alpha substituted with a halogen, and an aldehyde having a carbon chain length of not in excess of four, in the proportions per mol of said aliphatic acid of one-fifth to two and one-half mols of said aldehyde and one-fifth to one mol of said polyhydric alcohol, said reaction product including an acetal group and an alpha halogen substituted aliphatic acid group.

2. A bactericide and fungicide of claim 1, in which the halogen is bromine.

3. A bactericide and fungicide of claim 1, in which the acetal is a cyclic acetal.

4. A bactericide and fungicide of claim 1, in which the acetal is an acylic acetal.

5. A bactericide and fungicide of claim 1, in which the polyhydric alcohol is pentaerythritol.

6. A bactericide and fungicide of claim 1, in which the polyhydric alcohol is glycerine.

7. A bactericide and fungicide of claim 1, in which the polyhydric alcohol is ethylene glycol.

8. A bactericide and fungicide of claim 1, in which the polyhydric alcohol has a carbon chain length of at least three carbon atoms and at least two unreacted hydroxyl groups at the time of esterification and acetal formation, and which in addition has a polyoxyethylene chain, which also incorporates a mutual phase of iodine.

9. The method of controlling the growth of bacteria and fungi, which comprises adding to an aqueous system in which control is to take place from 10 to 500 parts per million of a reaction product of a polyhydric alcohol having a ratio of hydroxyl groups to carbon atoms of not less than 1 to 3, an alpha halogen substituted aliphatic acid having a carbon chain length of not less than four carbon atoms and an aldehyde having a carbon chain length of not in excess of four carbon atoms in the proportoins per mol of said aliphatic acid of one-fifth to two and one-half mols of said aldehyde and one-fifth to one mol of said polyhydric alcohol, said reaction product having an acetal group and halogenated acetic acid group.

10. The method of claim 9, in which the halogen is bromine.

11. The method of claim 9, in which the polyhydric alhol has a carbon chain link of at least three carbon atoms and at least two unreacted hydroxyl groups at the time of esterification and acetal formation, and which in addition has a polyoxyethylene chain, containing a mutual phase of iodine, which also comprises feeding the resultant compound in a mutual phase of iodine, in a concentration between 10 and 500 p.p.m.

12. The method of claim 9, wherein said aqueous system includes industrial water and said reaction product is added to combat slime.

13. The method of claim 9, wherein said reaction product is brought into contact with paper pulp in said aqueous system to combat slime.

References Cited by the Examiner

UNITED STATES PATENTS

| 2,873,249 | 2/59 | Schwartz | 260—487 X |
| 2,925,435 | 2/60 | Schwerdle | 260—487 |
| 2,931,754 | 4/60 | Baldridge. | |
| 3,052,594 | 6/62 | Baker | 162—161 |
| 3,082,242 | 3/63 | Miller et al. | |

DONALL H. SYLVESTER, *Primary Examiner.*

MORRIS O. WOLK, *Examiner.*